(12) United States Patent
Pradhan et al.

(10) Patent No.: US 9,961,442 B2
(45) Date of Patent: May 1, 2018

(54) ENGINE FOR HUMAN LANGUAGE COMPREHENSION OF INTENT AND COMMAND EXECUTION

(71) Applicant: Zero Labs, Inc., San Francisco, CA (US)

(72) Inventors: Rajesh Pradhan, San Francisco, CA (US); Amit Pradhan, San Francisco, CA (US)

(73) Assignee: Zero Labs, Inc., San Francisco, CA (US)

( * ) Notice: Subject to any disclaimer, the term of this patent is extended or adjusted under 35 U.S.C. 154(b) by 175 days.

(21) Appl. No.: 14/850,747

(22) Filed: Sep. 10, 2015

(65) Prior Publication Data

US 2016/0005401 A1 Jan. 7, 2016

Related U.S. Application Data

(63) Continuation-in-part of application No. 13/683,909, filed on Nov. 21, 2012, now Pat. No. 9,158,759.

(60) Provisional application No. 61/562,109, filed on Nov. 21, 2011.

(51) Int. Cl.
*G10L 15/00* (2013.01)
*H04R 3/00* (2006.01)
*G10L 21/0208* (2013.01)
*G10L 15/18* (2013.01)
*G10L 21/0216* (2013.01)

(52) U.S. Cl.
CPC .......... *H04R 3/005* (2013.01); *G10L 21/0208* (2013.01); *G10L 15/18* (2013.01); *G10L 2021/02166* (2013.01)

(58) Field of Classification Search
CPC . G10L 21/0208; G10L 15/20; G10L 21/0272; G06F 17/2785
USPC ......... 704/233, 200–231, 272, 270, 500–504
See application file for complete search history.

(56) References Cited

U.S. PATENT DOCUMENTS

| | | | |
|---|---|---|---|
| 6,598,017 | B1 | 7/2003 | Yamamoto et al. |
| 6,658,627 | B1 | 12/2003 | Gallup et al. |
| 7,523,031 | B1 | 4/2009 | Wakai et al. |
| 7,702,508 | B2 | 4/2010 | Bennett |
| 2002/0143543 | A1 | 10/2002 | Slrivara |

(Continued)

OTHER PUBLICATIONS

Invitation to Pay Additional Fees—PCT Article 17(3)(a) and Rules 40.1 and 40.2(e) dated Oct. 28, 2016, International PCT Patent Application No. PCT/US2016/051352 with filing date of Sep. 12, 2016., (2 pages).

(Continued)

*Primary Examiner* — Huyen Vo
(74) *Attorney, Agent, or Firm* — Stephen M. De Klerk (57) ABSTRACT

The invention provides a computer system for interacting with a user. A set of concepts initially forms a target set of concepts. An input module receives a language input from the user. An analysis system executes a plurality of narrowing cycles until a concept packet having at least one concept has been identified. Each narrowing cycle includes identifying at least one portion of the language and determining a subset of concepts from the target set of concepts to form a new target subset. An action item identifier identifies an action item from the action items based on the concept packet. An action executer that executes an action based on the action item that has been identified.

6 Claims, 6 Drawing Sheets

(56) References Cited

U.S. PATENT DOCUMENTS

| | | |
|---|---|---|
| 2004/0215449 A1 | 10/2004 | Roy |
| 2005/0060142 A1* | 3/2005 | Visser ................. G10L 21/0208 704/201 |
| 2005/0251390 A1 | 11/2005 | Catchpole |
| 2007/0050343 A1 | 3/2007 | Siddaramappa et al. |
| 2008/0065381 A1 | 3/2008 | Matsumoto |
| 2008/0249771 A1 | 10/2008 | Wahab |
| 2009/0254338 A1* | 10/2009 | Chan ................... G10L 21/0272 704/205 |
| 2009/0265162 A1 | 10/2009 | Ezzat et al. |
| 2009/0276396 A1* | 11/2009 | Gorman .............. G06F 17/2785 |
| 2009/0327921 A1 | 12/2009 | Holm-Peterson et al. |
| 2010/0070274 A1* | 3/2010 | Cho ........................ G10L 15/20 704/233 |
| 2010/0106272 A1* | 4/2010 | Sato ................. G11B 20/10527 700/94 |
| 2010/0211379 A1 | 8/2010 | Gorman et al. |
| 2012/0166429 A1 | 6/2012 | Moore et al. |
| 2013/0125014 A1 | 5/2013 | Sharif-Ahmadi et al. |
| 2013/0132072 A1 | 5/2013 | Pradhan et al. |
| 2014/0278436 A1 | 9/2014 | Khanna et al. |
| 2014/0310005 A1 | 10/2014 | Brown et al. |
| 2015/0088499 A1 | 3/2015 | White et al. |

OTHER PUBLICATIONS

International Search Report and Written Opinion dated Jan. 13, 2013, International Patent Application No.: PCT/US12/66381 with International Filing Date of Nov. 21, 2012, (8 pages).

International Search Report and Written Opinion dated Feb. 6, 2017, International PCT Patent Application No. PCT/US2016/051352 with filing date of Sep. 12, 2016., (13 pages).

* cited by examiner

ENGINE FOR HUMAN LANGUAGE COMPREHENSION OF INTENT AND COMMAND EXECUTION

CROSS-REFERENCE TO RELATED APPLICATIONS

This application is a continuation-in-part of U.S. patent application Ser. No. 13/683,909, filed on Nov. 21, 2012, which claims priority from U.S. Provisional Patent Application No. 61/562,109, filed on Nov. 21, 2011, all of which are incorporated herein by reference in their entirety.

BACKGROUND OF THE INVENTION

1). Field of the Invention

This invention relates to an engine that is used for human speech, human voice, or text based language recognition, comprehension of intent and command execution with particular application for providing an input into an executable application.

2). Discussion of Related Art

Figure 8:
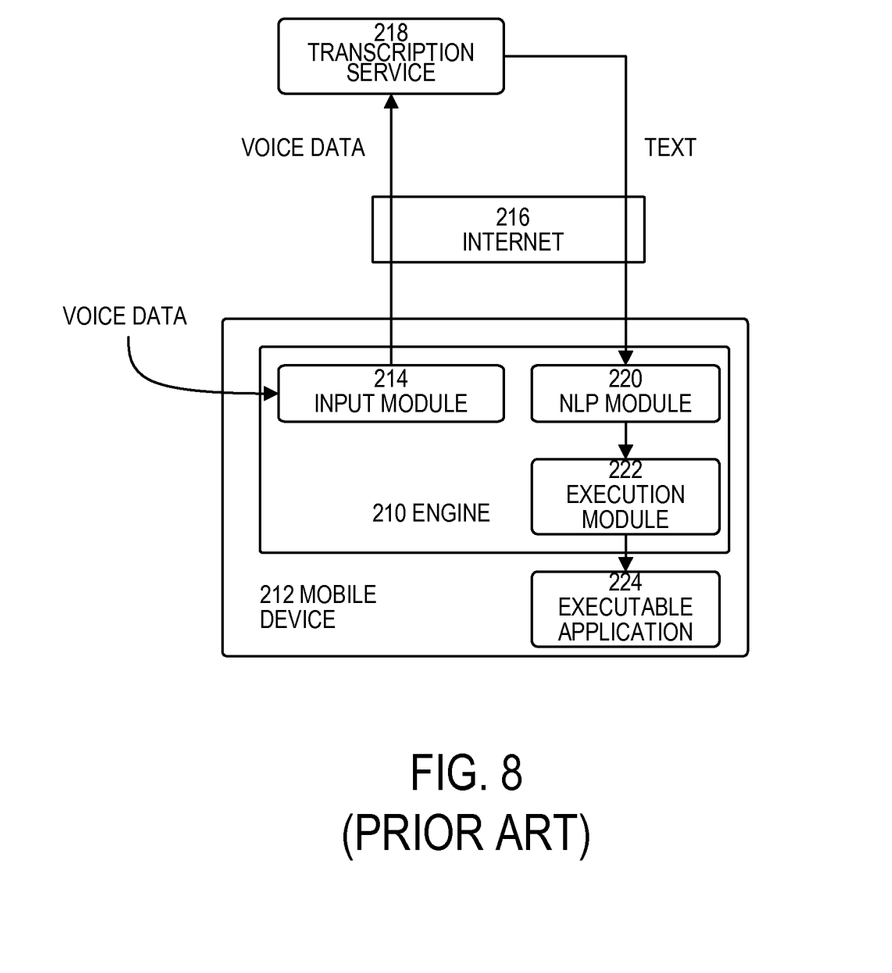
FIG. 8 is a block diagram illustrating how voice data is analyzed and redacted upon in a system according to the prior art.

FIG. 8 of the accompanying drawings illustrates an engine 210 for interpreting voice data and executing commands based on the voice data. The engine 210 is located on a device such as mobile device 212. A microphone of the mobile device 212 is used to detect and record the voice data into an input module 214. The input module 214 then transmits the voice data over the Internet 216 to a transcription service 218. The transcription service 218 automatically transcribes the voice data into text and transmits the text back over the Internet 216 back to the mobile device 212. A natural language processing (NLP) module 220 analyzes the text and provides the analysis to an execution module 222. The NLP module 220 may for example find synonyms of the text. The execution module 222 then enters the text or synonyms of the text into an executable application 224 such as a maps application, a calendar application, an application for restaurants or services, or the like. When the user records a command, "Find me a cheap restaurant nearby. I don't like Italian food." The execution module 222 selects the appropriate execution application for restaurants nearby. However, further data that is entered into the executable application 224 returns results for Italian food restaurants that are nearby, which is not what the user had intended.

SUMMARY OF THE INVENTION

The invention provides a computer system for interacting with a user, including a processor, a storage medium connected to the processor and a set of instructions on the storage medium and executable by the processor. The set of instructions includes at least one data store, a set of concepts in the data store, the set of concepts initially forming a target set of concepts, a plurality of action items in the data store, an input module receiving an input from the user, the input including language, an analysis system that executes a plurality of narrowing cycles until a concept packet having at least one concept has been identified, wherein each narrowing cycle includes i) identifying at least one portion of the language and ii) based on the portion of the language identifying a subset of concepts from the target set of concepts, the subset of concepts forming the target set of concepts to the exclusion of concepts previously forming part of the target set of concepts that are not based on the portion of the language. The set of instructions further includes an action item identifier that identifies an action item from the action items based on the concept packet and an action executer that executes an action based on the action item that has been identified.

The invention also provides a computer-based method of interacting with a user, including storing, with a processor of a computer system, a set of concepts in a data store of the computer system, the set of concepts initially forming a target set of concepts, storing, with the processor, a plurality of action items in the data store, receiving, with the processor, an input from the user, the input including language, executing, with the processor, a plurality of narrowing cycles until a concept packet having at least one concept has been identified, wherein each narrowing cycle includes i) identifying at least one portion of the language and ii) based on the portion of the language identifying a subset of concepts from the target set of concepts, the subset of concepts forming the target set of concepts to the exclusion of concepts previously forming part of the target set of concepts that are not based on the portion of the language, identifying, with the processor, an action item from the action items based on the concept packet and executing, with the processor, an action based on the action item.

The invention further provides a computer-readable medium having storage thereon and a set of instructions executable by a processor of a computer to perform a computer-based method of interacting with a user, including storing, with a processor of a computer system, a set of concepts in a data store of the computer system, the set of concepts initially forming a target set of concepts, storing, with the processor, a plurality of action items in the data store, receiving, with the processor, an input from the user, the input including language, executing, with the processor, a plurality of narrowing cycles until a concept packet having at least one concept has been identified, wherein each narrowing cycle includes i) identifying at least one portion of the language and ii) based on the portion of the language identifying a subset of concepts from the target set of concepts, the subset of concepts forming the target set of concepts to the exclusion of concepts previously forming part of the target set of concepts that are not based on the portion of the language, identifying, with the processor, an action item from the action items based on the concept packet and executing, with the processor, an action based on the action item.

The invention also provides a computer system for interacting with a user, including a processor; a storage medium connected to the processor, at least two microphones detecting sound to obtain a stereo input, the sound including speech from the user and background noise and a set of instructions on the storage medium and executable by the processor, The set of instructions includes a triangulator analyzing the stereo input to isolate the speech from the sound using the position of the user relative to the microphone and a dispatcher submitting the speech for analysis.

The invention further provides a computer-based method of interacting with a user, including detecting, with a processor, sound using at least two microphones to obtain a stereo input, the sound including speech from the user and background noise, analyzing, with the processor, the stereo input to isolate the speech from the sound using the position of the user relative to the microphone and dispatching with the processor, the speech for analysis.

The invention also provides a non-transitory computer-readable medium having storage thereon and a set of instructions executable by a processor of a computer to perform a computer-based method of interacting with a user, including detecting, with a processor, sound using at least through two microphones to obtain a stereo input, the sound including speech from the user and background noise, analyzing, with the processor, the stereo input to isolate the speech from the sound using the position of the user relative to the microphone and dispatching with the processor, the speech for analysis.

The invention further provides a network system including a user computer system for interacting with a user. The user computer system including a processor, a storage medium connected to the processor and a set of instructions on the storage medium and executable by the processor. The set of instructions including at least one data store, a set of concepts in the data store, the set of concepts initially forming a target set of concepts, a plurality of action items in the data store, an input module receiving an input from the user, the input including language, an analysis system that executes a plurality of narrowing cycles until a concept packet having at least one concept has been identified, wherein each narrowing cycle includes i) identifying at least one portion of the language and ii) based on the portion of the language identifying a subset of concepts from the target set of concepts, the subset of concepts forming the target set of concepts to the exclusion of concepts previously forming part of the target set of concepts that are not based on the portion of the language, an action item identifier that identifies an action item from the action items based on the concept packet, an action executer that executes an action based on the action item that has been identified, a concept management module transmitting user context over a network when the user computer system is connected to the network, a server comprising, a processor, a storage medium connected to the processor and a set of instructions on the storage medium and executable by the processor. The set of instructions including a cloud vertical knowledge container holding a plurality of concepts and a user context trigger that receives user context from the user computer system when the server is connected to the user computer system over a network and delivering user based data based on the user context from the cloud vertical knowledge container to the user device when the user device is connected to the server over the network, the concept management module storing the context based data as part of the set of concepts.

The invention also provides a computer-based method of interacting with a user, including storing, with a processor of a user computer system, a set of concepts in a data store of the computer system, the set of concepts initially forming a target set of concepts, storing, with the processor of the user computer system, a plurality of action items in the data store, receiving, with the processor of the user computer system, an input from the user, the input including language, executing, with the processor of the user computer system, a plurality of narrowing cycles until a concept packet having at least one concept has been identified, wherein each narrowing cycle includes i) identifying at least one portion of the language and ii) based on the portion of the language identifying a subset of concepts from the target set of concepts, the subset of concepts forming the target set of concepts to the exclusion of concepts previously forming part of the target set of concepts that are not based on the portion of the language, identifying, with the processor of the user computer system, an action item from the action items based on the concept packet, executing, with the processor of the user computer system, an action based on the action item and transmitting user context over a network when the user computer system is connected to the network.

The invention further provides a non-transitory computer-readable medium having storage thereon and a set of instructions executable by a processor of a computer to perform a computer-based method of interacting with a user, including storing, with a processor of a user computer system, a set of concepts in a data store of the computer system, the set of concepts initially forming a target set of concepts, storing, with the processor of the user computer system, a plurality of action items in the data store, receiving, with the processor of the user computer system, an input from the user, the input including language, executing, with the processor of the user computer system, a plurality of narrowing cycles until a concept packet having at least one concept has been identified, wherein each narrowing cycle includes i) identifying at least one portion of the language and ii) based on the portion of the language identifying a subset of concepts from the target set of concepts, the subset of concepts forming the target set of concepts to the exclusion of concepts previously forming part of the target set of concepts that are not based on the portion of the language, identifying, with the processor of the user computer system, an action item from the action items based on the concept packet, executing, with the processor of the user computer system, an action based on the action item and transmitting user context over a network when the user computer system is connected to the network.

The invention also provides a computer system for interacting with a user, including a plurality of processors including a central processing unit (CPU) and a graphics processing unit (GPU), a storage medium connected to the processor and a set of instructions on the storage medium and executable by the processor. The set of instructions including a processor resource determinator that determines distribution of language processing to the CPU and the GPU, an input module receiving an input from the user, the input including language and a language processor that analyzes the language, the language being analyzed by the CPU and GPU based on the distribution determined by the processor resource determinator.

The invention further provides a computer-based method of interacting with a user, including determining, with at least one of a central processing unit (CPU) and a graphics processing unit (GPU), distribution of language processing to the CPU and the GPU, receiving, with at least one of a central processing unit (CPU) and a graphics processing unit (GPU), an input from the user, the input including language and analyzing the language, the language being analyzed by the CPU and GPU based on the distribution determined by the processor resource determinator.

The invention also provides a non-tangible computer-readable medium having storage thereon and a set of instructions executable by a processor of a computer to perform a computer-based method of interacting with a user, including determining, with at least one of a central processing unit (CPU) and a graphics processing unit (GPU), distribution of language processing to the CPU and the GPU, receiving, with at least one of a central processing unit (CPU) and a graphics processing unit (GPU), an input from the user, the input including language and analyzing the language, the language being analyzed by the CPU and GPU based on the distribution determined by the processor resource determinator.

BRIEF DESCRIPTION OF THE DRAWINGS

The invention is further described by way of example with reference to the accompanying drawings, wherein.

DETAILED DESCRIPTION OF THE INVENTION

Figure 1:
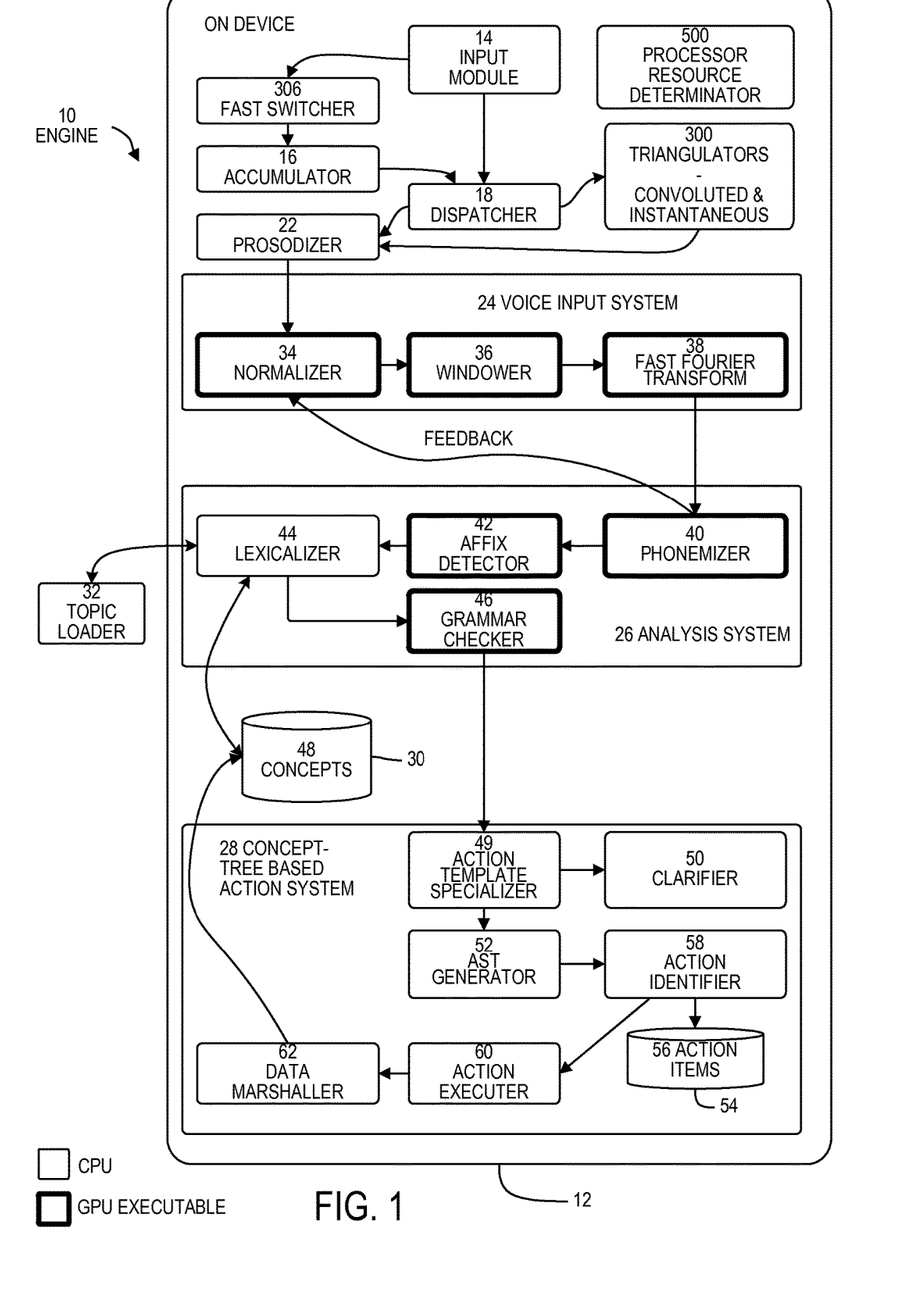
FIG. 1 is block diagram of an engine, according to an embodiment of the invention, that is used for human speech, human voice, or text based language recognition, comprehension of intent and command execution.

FIG. 1 of the accompanying drawings illustrates an engine 10 that is used for human voice (or text based speech) recognition, comprehension of intent and command execution with particular application for providing an input into an executable application. The components of the engine 10 within a block 12 are all located within a single device such as a mobile device or is part of an information system of a vehicle. Minimum requirements for such a device include a 600 MHz processor, support for an audio I/O system with 16 bit pulse-code modulation (PCM) encoding and a microphone with a sampling rate of 16 kHz, an operating system that can be targeted with a C++ 14 tool chain, at least 100 megabytes of permanent storage, and optionally Internet access. Many mobile devices that are available at this time fulfill these requirements. All recognition, comprehension and command execution are carried out by the components within the block 12, which means that Internet access is only needed in special situations where additional data may be required. As such, the components of the engine 10 within the block 12 can be functionally utilized on a mobile device that is used without connection to a remote server, for example within an airplane without Internet access, or within a vehicle without making use of satellite communication capabilities.

The invention will be described for the processing of speech, although it should be understood that concepts herein may be used for processing of human voice data other than speech, such as recorded voicemails, recorded conversations etc. or for processing human language, in general. As such, it will be understood that recorded voice data and live speech are each a subspecies of human language.

The engine 10 includes an input module 14, an accumulator 16, a dispatcher 18, a prosodizer 22, a voice input system 24, an analysis system 26, a concept-tree based action system 28, and a concept store 30 within the block 12. The engine 10 also includes a topic loader 32 that is located in the cloud.

The input module 14 is connected to a microphone to collect speech in the form of voice data from a user. The input module 14 receives the speech in the time domain. The accumulator 16 is connected to the input module 14 and accumulates speech in the time domain. The accumulator 16 is a cyclic ring buffer that stores the speech as bytes of data up to a certain limit. The dispatcher 18 is connected to both the accumulator 16 and the input module 14. The dispatcher 18 receives chunks of the speech from the accumulator 16 after being buffered by the accumulator 16. In a situation where no buffering is required, the dispatcher 18 receives the speech directly from the input module 14.

The prosodizer 22 is connected to the dispatcher 18. The dispatcher 18 sends the speech in parallel in the time domain to the prosodizer 22. The prosodizer 22 aims to determine the sentiment of the speech and then feeds the speech in the time domain into the voice input system 24.

The voice input system 24 includes a normalizer 34, a widower 36 and a fixed point fast Fourier Transform 38 connected in series to one another. The normalizer 34 is connected to the prosodizer 22. The normalizer 34 receives the speech from the dispatcher 18 via the prosodizer 22. The normalizer receives the speech in the time domain and normalizes the speech according to conventional principles. The windower 36 receives the speech in the time domain from the normalizer 34 and creates overlapping windows of the speech in the time domain according to a conventional method. The fast Fourier Transform 38 receives the speech from the windower 36 in the time domain and transforms the speech to the frequency domain before entering the speech into the analysis system 26. The fast Fourier Transform 38 is a light transformer in that it is fast Fourier Transform that uses fewer than fifteen, and preferably only twelve features. All further processing of the speech is done in the frequency domain.

Figure 2:
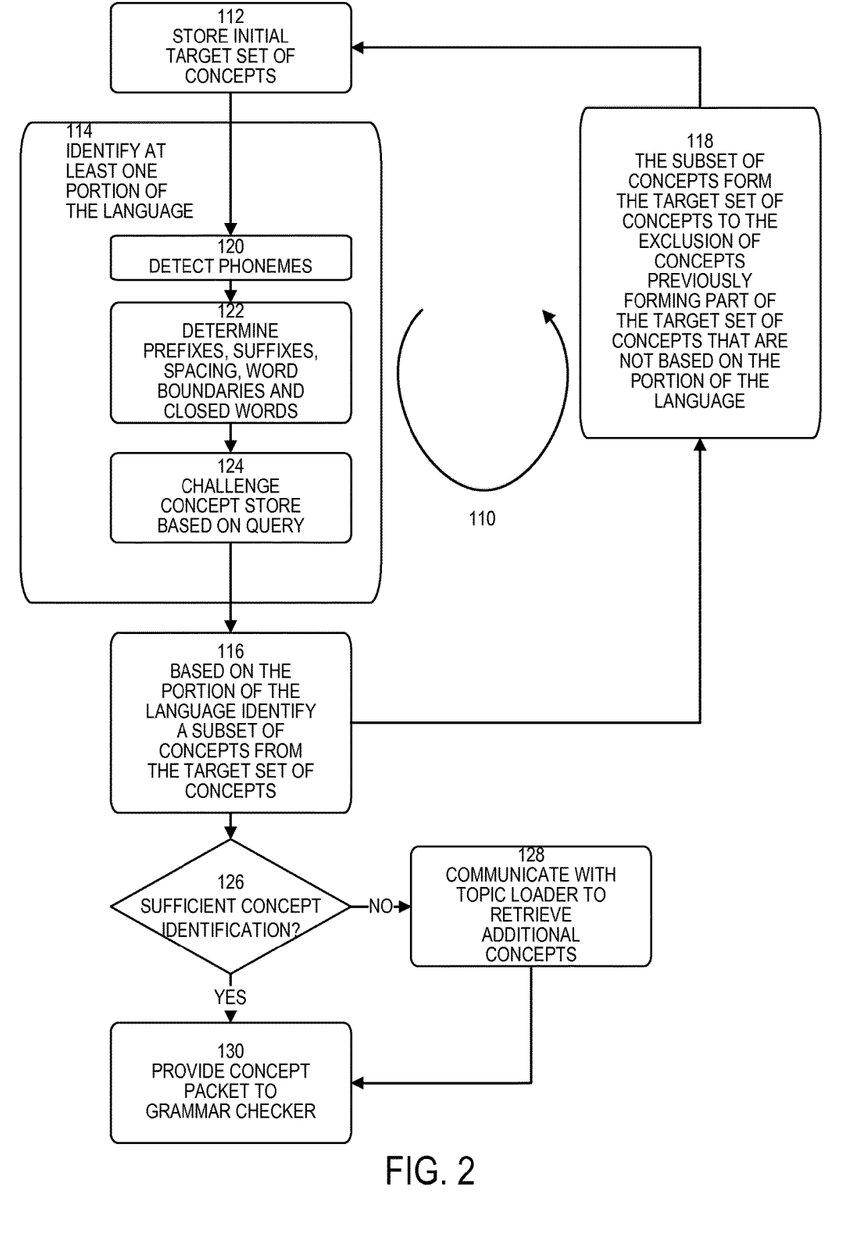
FIG. 2 is a flowchart illustrating functioning of a phonemizer, affix detector and lexicalizer of the engine.

The analysis system 26 includes a phonemizer 40, an affix detector 42, a closed word detector (not shown), a lexicalizer 44 and a grammar checker 46 connected in series to one another. As also shown in FIG. 2, an initial target set of concepts is stored (112). The function of the phonemizer 40, affix detector 42 and lexicalizer 44 is to execute a plurality of narrowing cycles 110 until a concept packet having at least one concept has been identified. Each narrowing cycle includes:

i) identifying at least one portion of the speech (114); and
ii) based on the portion of the speech identifying a subset of concepts from the target set of concepts (116), the subset of concepts then forming the target set of concepts to the exclusion of concepts previously forming part of the target set of concepts that are not based on the portion of the speech (118).

The phonemizer 40 uses the eight features provided by the fast Fourier Transform 38 to detect all phonemes in the speech (120). Each phoneme has a confidence score associated therewith representing its likely detection. These phonemes may be detected for the entire section for the speech that has been received from the user or incrementally as more and more sections of the speech is received. The English speech has a standardized list of 51 phonemes as represented by the International Phonetic Alphabet and an additional four custom phonemes specific to the phonemizer 40.

The affix detector 42 then determines which ones of the phonemes or combinations of phonemes are prefixes and which one of the phonemes are suffixes (122), and does so probabilistically based on the confidence scores. Certain phonemes such as "ia" typically do not form prefixes and are more likely to be suffixes, by way of example. During a learning phase the frequency of occurrence of all phonemes and whether they are prefixes or suffixes has been determined across all words in the English speech and the affix detector 42 has been programmed with this data in a light database. For example, the word "abacus" has the phonemes are: ab; a; c; us. The affix detector 42 determines probalistically that "ab" is a prefix, "us" is a suffix and that the spacing between the prefix and the suffix is two, corresponding to the number of phonemes between the prefix and the suffix. Furthermore, the affix detector 42 determines boundaries of words based on the prefixes and suffixes. The affix detector 42 has for example determined that the recorded portion of the speech corresponding to "abacus" is a word based on the determination of the prefix "ab" and the suffix "us." The affix detector 42 then repeats this process for other parts of the speech. In most cases words are determined in this manner wherein one prefix, suffix and space are known. To make the system faster, approximately 280 closed words are programmed to be detectable such as "the," "every," "some," etc. plus 280 loan words from other languages such as "zeitgeist," "haute couture," etc.

The lexicalizer 44 is connected to the concept store 30. The concept store 30 includes a set of concepts that initially forms a target set of concepts. The lexicalizer 44 then generates a query with criteria corresponding to the prefix, suffix and spacing between the prefix and the suffix, and challenges the concept store based on the query (124). The lexicalizer 44 does not query the concept store 30 for closed words. All concepts 48 within the concept store 30 that match the query then form part of a new target set that excludes the concepts 48 that do not match the criteria of the query. A probability is attached to each concept in the new concept store wherein the probability signifies how closely the respective concept is related to the criteria of the query. Concepts for words having slightly smaller or larger spacing between the prefix and the suffix are also extracted with a corresponding reduction in confidence scores. By way of example, the query may have a prefix "ac," a suffix "ia," and a space of two, in which case the following terms may be extracted, sorted by spacing:

ac ac is a c a de mia, etc.

During a following narrowing cycle a new target set of concepts is identified. The new target set includes the previous target set but excludes some of the concepts previously identified. As such, a narrowing cycle has happened. By way of example, a user may start by saying, "Find me an inexpensive . . . " and a first set of concepts may be identified from the initial speech for example a target set of 100 concepts. The user then may complete the speech to say, "Find me a cheap restaurant nearby" in which case the target set is narrowed to a target set of for example only 10 of the 100 concepts in the previous target set. It may also be possible to also expand the target set. When the user then proceeds to say, "Find me a cheap restaurant nearby. I don't like Italian food." the target set is then again expanded with the information in the second sentence to render a new target set that includes the 10 concepts from the previous target set and two more concepts thus totaling 12 concepts.

The concepts that are identified in the target set are then grouped in a concept packet. The lexicalizer 44 then provides the concept packet to the grammar checker 46. The grammar checker 46 receives the concept packet and performs a grammar check on the concept packet to determine whether a combination of parts, or a phrase, of the speech match one of a plurality of phrase rules having reference combinations. The lexicalizer 44 produces a "flat" concept packet and the grammar checker 46 "folds" the concept packet to represent speech in a more conventional manner having parts of speech in appropriate places. When a match is found between the combination of the parts of the speech and a reference combination, then a determination is also made as to what type of phrase the speech represents. For example, the following list represents noun phrases:

Article+Noun
Pronoun+Noun
Adjective Phrase+Noun
Adjective Phrase+Cardinal+Noun
Adjective Phrase+Noun+Prepositional Phrase
Article+Adjective Phrase+Noun
Pronoun+Adjective Phrase+Noun
Noun Phrase+Adjective Phrase+Noun
Noun Phrase+Prepositional Phrase Should the combination of parts of the speech match any one of the standard noun phrases, then the concept packet is updated to represent that the combination of parts, or phrase, is a "noun phrase."

Alternatively, the combination of parts of the speech may be a verb phrase represented by any one of the following reference combinations:

Verb
Verb+Delimiter
Verb+Noun
Verb+Adjective Phrase
Verb+Prepositional Phrase
Verb+Adverb
Verb Phrase+Adverb
Verb Phrase+Adverbial Phrase If the combination of parts of the speech match any one of the reference combination for verb phrases, then the concept packet is updated to represent that the combination of parts of the speech represents a "verb phrase."

The grammar checker 46 also performs time and date translation to enable uniform processing. The following list represents typical time phrases:

Hour+':'+MinuteTime
ShortTime+':'+SecondTime
HourTime+O'clock
ShortTime+DayPart
DisplayTime+DayPart
HourTime+TimeFragment (Hour)
MinuteTime+TimeFragment (Minute)
SecondTime+TimeFragment (Second)
Cardinal+TimeFragment
HourTimeDuration+Conjunction(And)+MinuteTimeDuration
HourTimeDuration+Conjunction(And)+SecondTimeDuration
MinuteTimeDuration+Conjunction(And)+SecondTimeDuration
Cardinal+Conjunction(And)+Article(A)+half+TimeFragment
MinuteTime+Past+HourTime
SpokenTime+TimeOfDay
SpokenTime+DayTime
MinuteTime+Adpostion(to)+HourTime
Article (A)+Quarter+Adpostion(to)+HourTime
Article (A)+Quarter+past+HourTime
Timezone+'+'+ShortTime
Timezone+'−'+ShortTime
ShortTime+Timezone
ZonalTime+'('+ShortTime+Timezone+')'
ZonalTime+'('+ShortTime+DayPart+Timezone+')'
RelativeDay+TimeOfDay
Demonstrative Pronoun(This)+TimeOfDay
DayTime+ClockTime
TimeOfDay+HourTime By way of example, the user may say, "Half past eight in the morning." and the grammar checker 46 translates the phrase to "8:30 am."

The concept-tree based action system 28 includes an action template specializer 49, a clarifier 50, an abstract syntax tree (AST) generator 52, an action item store 54 holding action items 56, an action identifier 58, an action executer 60, and a data marshaller 62.

The action template specializer 49 is connected to the grammar checker 46. The action template specializer 49 receives the concept packet from the grammar checker 46. The concept packet is updated by the grammar checker 46 to indicate whether the concept packet fails or passes the grammar checker 46. If the concept packet indicates that it has failed the grammar checker 46, then the action template specializer 49 invokes the clarifier 50. The clarifier 50 communicates with the user to receiver further information from the user. The clarifier 50 typically provides a voice output through a speaker, to which the user responds by providing additional speech through the microphone into the input module 14. The additional information forms speech that is again processed through the engine 10 up to the lexicalizer 44 and the lexicalizer 44 then updates the concept packet with a new concept based on the additional information. The concept packet then passes through the grammar checker 46 as hereinbefore described before reaching the action template specializer 49.

If the concept packet includes a flag indicating that the concept packet has passed the grammar checker 46, the action template specializer 49 bypasses the clarifier 50 and passes the concept packet on to the AST generator 52 that is connected to the action template specializer 49. The AST generator 52 utilizes concepts within the concept packet to generate a list of variables that are folded into a tree. For example, the user may say, "I don't like Italian food." The primary word in the tree is "like." Other concepts of the concept packet are built as an ecosystem of relationships around the word "like." The action identifier 58 is connected to the AST generator 52 and receives the variables from the AST generator 52. The action item store 54 is connected to the action identifier 58. The action identifier 58 uses the variables to select an action item from the action items 56 in the action items store 54.

The action items 56 each include a plurality of descriptors in the form of metadata. The action executer 60 is connected to the action identifier 58 and receives both the action items 56 and the variables from the action identifier 58. The action executer 60 then matches the variables to the action descriptors and executes an action based on any matching or mismatching that occurs between the variables and the action descriptors.

The device shown in FIG. 1 includes at least two microphones detecting sound to obtain a stereo input. The sound includes speech from the user and background noise. The engine 10 includes a triangulators 300 that analyze the stereo input to isolate the speech from the background noise of the sound using the position of the user relative to the microphone. The dispatcher 18 submits the speech for analysis to the prosodizer after the speech has been isolated.

Figure 3:
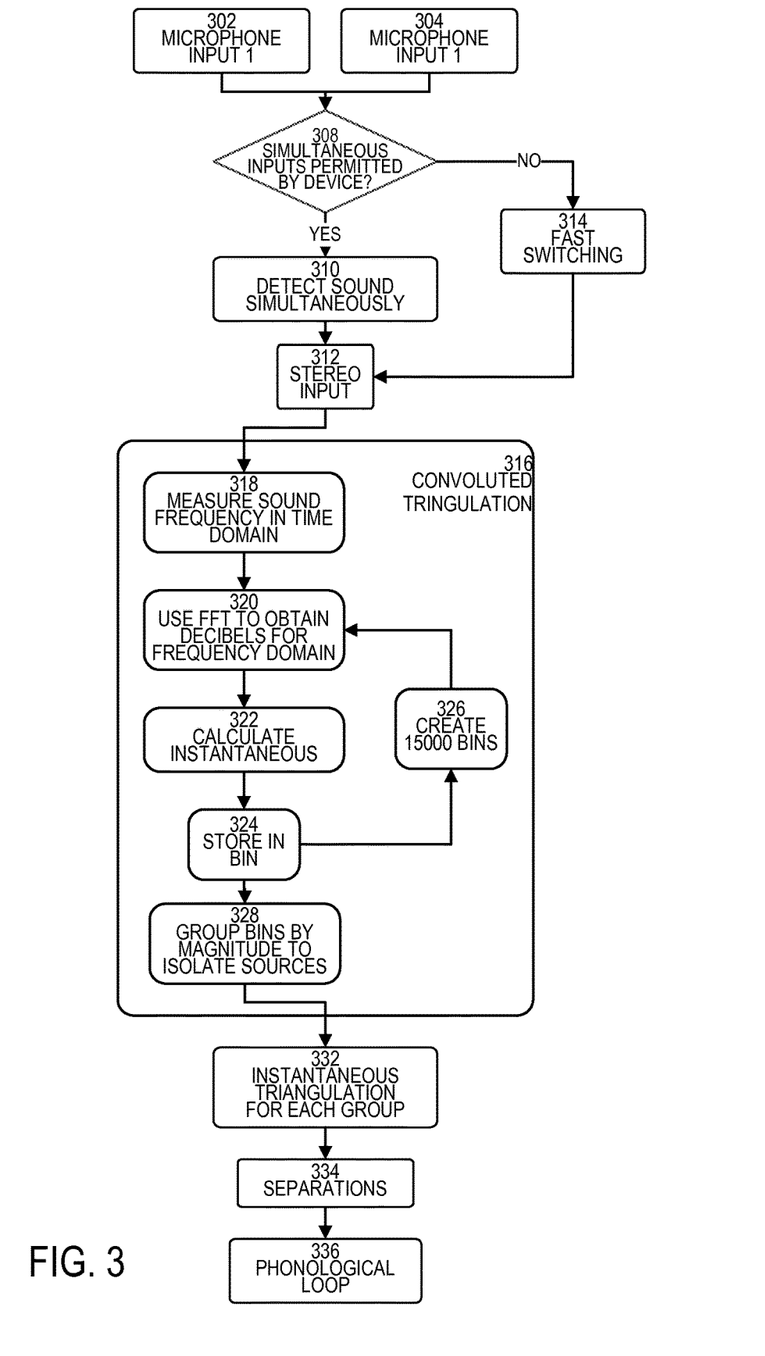
FIG. 3 is a flow chart illustrating sound source isolation.

FIG. 3 shows the sound isolation in more detail. Steps 302 and 304 represent microphone inputs from two microphones. As further shown in FIG. 1, a fast switcher 306 is located after the input module 14 and before the accumulator 16. As further shown in FIG. 3, the fast switcher 306 at 308 determines whether sound can be detected through the two microphones simultaneously. If the sound can be detected through the two microphones simultaneously then the fast switcher 306 at 310 detects the sound through the two microphones simultaneously to obtain a stereo input at 312. If the sound cannot be detected through the two microphones simultaneously then the fast switcher 306 at 314 switches detection of the sound between the two microphones.

The triangulators 300 in FIG. 1 include a convoluted triangulator that executes convoluted triangulation 316 in FIG. 3. At 318 frequency of the sound is measured in the time domain. At 320 a periodogram is used to obtain sound magnitude in decibels (dB) in the frequency domain. At 322 a 3D histogram is created using the periodogram extended with time. At 324 the instantaneous magnitude is stored in a respective bin of a plurality of bins. At 326 the bin-creation process is repeated until there are a total of up to 1200 bins. At 328 the bins are grouped using similar histogram magnitude to isolate sources of the sound.

The triangulators 300 in FIG. 1 further include an instantaneous triangulator. At 330 in FIG. 3 the instantaneous triangulator executes a fast independent component analysis (FastICA) for each group. Instantaneous triangulation may be required in cases where sound sources cannot be isolated by convoluted triangulation. Convoluted triangulation relies on different times that sound arrives at different microphones, whereas delayed arrival time is not permissible for instantaneous triangulation.

After sound isolation using instantaneous triangulation at 332, separations can be more easily determined between sound sources at 334. The isolated speech can then at 336 be processed using the phonological loop (narrowing cycles 110 in FIG. 2).

It can thus be seen that when multiple simultaneous input microphones are available with the hardware/device, the system has the ability to use triangulation to isolate the primary source of the speech input, thereby creating a far more accurate input recognition and segmentation process. Certain devices do not provide for the simultaneous input from multiple microphones, even when they have more than one input microphone on the device. This prevents the automatic triangulation of sound and prevents the Sound Isolation and Identification of primary speech source. To counter this issue, the system has the ability to randomly switch the input sources in a pattern that mimics the effect of multiple microphones operating simultaneously and is able to achieve the necessary Isolation and Identification of the primary speech source.

Figure 4:
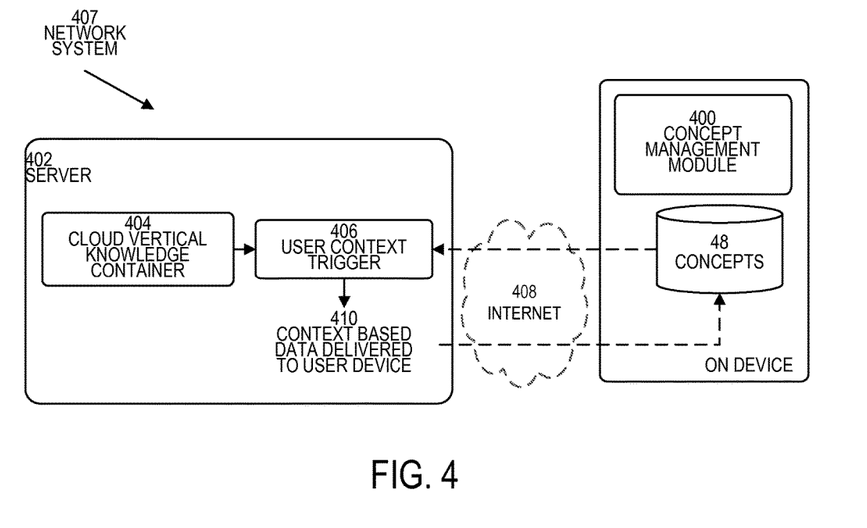
FIG. 4 is a block diagram illustrating network dependent context-based data delivery.

As shown in FIG. 4, a concept management module 400 forms part of the engine on the device (user computer system) and a server 402 is provided having a cloud vertical knowledge container 404 and a user context trigger 406. The server 402 and device jointly form a network system 407 that may or may not include the Internet 408 if the Internet 408 is available. The concept management module 400 transmits user context over a network in the form of the Internet 408 when the device is connected to the Internet 408.

The cloud vertical knowledge container 404 holds a plurality of concepts.

The user context trigger 406 receives user context from the device when the server is connected to the device over the Internet 408 and at 410 delivers user based data based on the user context from the cloud vertical knowledge container 404 to the user device when the user device is connected to the server 402 over the Internet. The concept management module 400 stores the context based data as part of the set of concepts.

One of the primary features of the system is its ability to operate locally on the target device with a low data footprint. To achieve this, the system uses a central cloud-based propagation system to deliver relevant and contextual data to the user's target device, when needed and when the device is connected to the Internet. This allows for only relevant and context driven data to users, rather than a one-time delivery of all possible data that might not be required for the user.

The device shown in FIG. 1 includes a plurality of processors including a central processing unit (CPU) and a graphics processing unit (GPU). The engine 10 further includes a processor resource determinator 500 that determines distribution of language processing to the CPU and the GPU. The input module 14 subsequently receives a language input from the user. Other components of the engine then serve as a language processor that analyzes the language and the language is analyzed by the CPU and GPU based on the distribution determined by the processor resource determinator 500.

Figure 5:
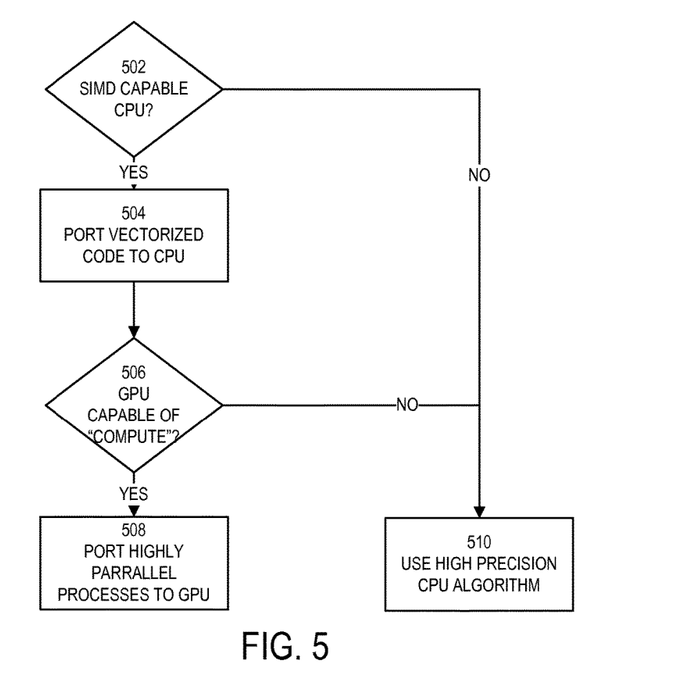
FIG. 5 is a flow chart illustrating porting of language processing to various processors.

FIG. 5 shows the functioning of the processor resource determinator 500 in FIG. 1 in more detail. At 502 a determination is made whether the CPU is capable of executing single instruction multiple data (SIMD) instructions. At 504 highly vectorized code is ported to the CPU if the CPU is capable of executing a SIMD algorithm as determined at 502. At 506 a determination is made whether the GPU is capable of executing a computing algorithm (whether the GPU is capable of executing a "compute" function that requires access to static memory for read and write purposes). At 508 highly parallel processes are ported to the GPU if the GPU is capable of executing a computing algorithm as determined at 506, while maintaining the CPU for executing vectorized code.

If a determination is made at 502 that the CPU is not SIMD capable then at 510 the CPU is used to execute a high precision algorithm instead of executing highly vectorized code.

If at 506 a determination is made that the GPU is not capable of executing a computing algorithm, then the CPU is used to execute a high precision algorithm instead of porting the parallel processes to the GPU at 508.

FIG. 1 illustrates components that are executed by the CPU and components that are capable of executing by the GPU. GPU executable components are shown in thicker lines and include the normalizer 34, windower 36, fast Fourier transform 38, phonemizer 40, affix detector 42 and grammar checker 46. These components may alternatively be executed by the CPU depending on GPU capabilities. All other components are executed by the CPU either as highly vectorized code or using high precision CPU algorithms.

Figures 6, 7:
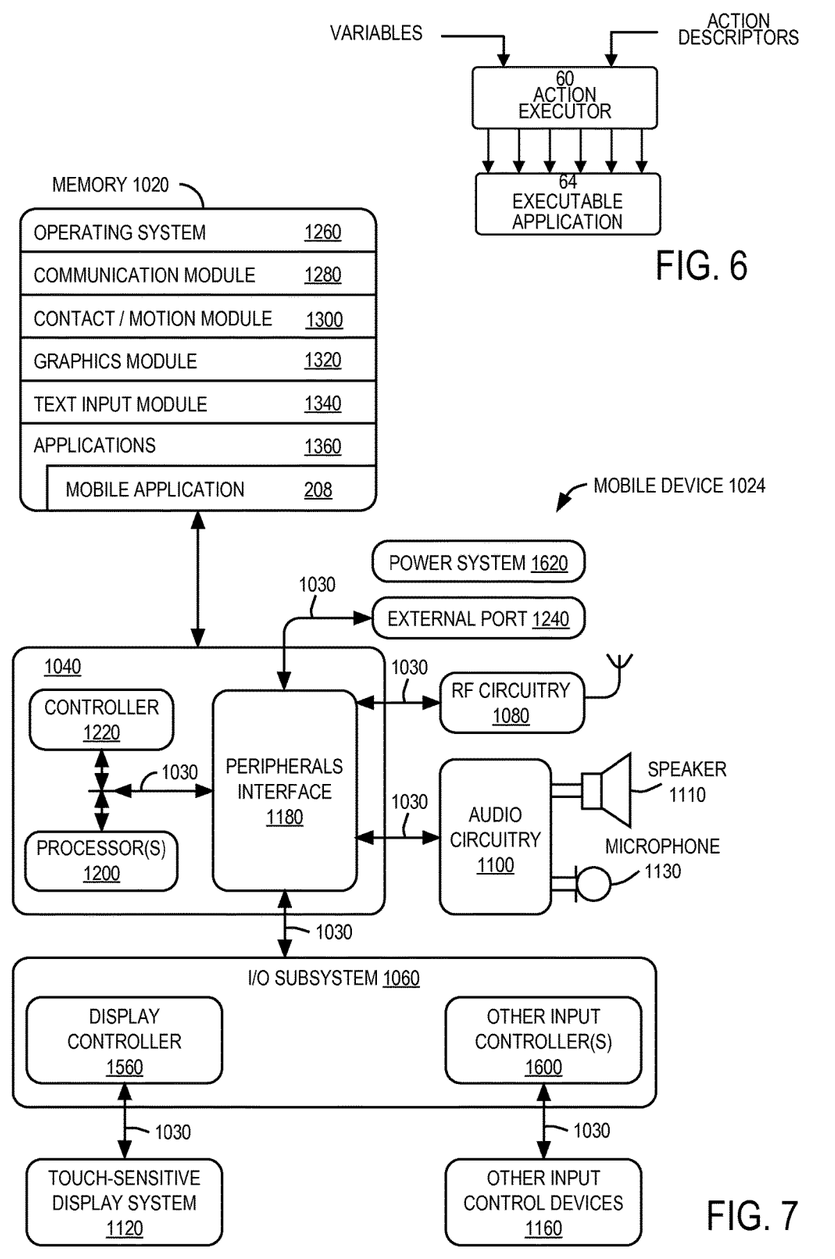
FIG. 6 is a block diagram of an action executer forming part of the engine in FIG. 1 and an executable application that receives parameters from the action executer.
FIG. 7 is a block diagram of a mobile device that can find application for the engine in FIG. 1.

FIG. 6 illustrates an executable application 64 that is connected to the action executer 60. The action executer 60 generates a set of parameters and enters the parameters into the executable application 64. The parameters are based on the variables generated by the AST generator 52 in FIG. 1 and the action descriptors are retrieved from the action item that has been identified in the action item store 54.

Referring again to FIG. 1, the data marshaller 62 is connected to the action executer 60 to update the concepts 48 in the concept store 30. By way of example, the user may use the phrase "Live and let die." The lexicalizer 44 will find concepts for idioms and movies in such a situation. If during further clarification by the clarifier 50, the user indicates that the user has meant movies, then the data marshaller 62 will update the concepts 48 to indicate that the user is a movie fan as opposed to a speech specialist.

All the actions hereinbefore described are executed on board by components within the block 12. The device that holds the components within the block 12 also has a network interface device. In the case of a mobile device, the network interface device may allow for connection to a wireless network or to a cellular phone data network. In the case of an information system forming part a vehicle, the network interface device may be satellite communications device.

The lexicalizer 44 also determines whether at least one concept that is sufficient is identified from the concepts 48 in the concept store 30 (126 in FIG. 2). If at least one concept that is sufficient has been identified, then the lexicalizer 44 does not communicate over the network interface device with the topic loader 32. If the lexicalizer 44 determines that not at least one concept that is sufficient has been identified, then the lexicalizer 44 communicates with the topic loader 32 to retrieve one or more additional concepts (128). Whether a concept is sufficient or not depends on a probability that the lexicalizer 44 determines as hereinbefore described. The additional concept that is retrieved from the topic loader 32 is then used in the concept packet that is provided to the grammar checker 46 (130).

The system as hereinbefore described provides for a low friction communication between a user and third party services during all kinds of interaction, thereby enabling average users to exploit the full capabilities of the engine 10 and underlying services such as the executable application 64. Examples of informative conversations includes queries (Who frames Roger Rabbit?), assertions (Pink is the new black), opinions (the 49ers will cream the Giants), beliefs (Geeks are cool, but only if they wear t-shirts) and user experiences/feelings (Today was a great day. I finally flew an F-16 although I had my eyes screwed shut the whole time.). Imperative conversations are task oriented (I need tickets to the World Series now!). The engine 10 provides interactive feedback and clarification during conversation using the same medium as the input, e.g. voice initiated conversation will result in a voice based question if any clarification is required. The engine 10 allows for implicit and explicit personalization via the data marshaller 62. For example, a user who mentions that he or she prefers Thai over Chinese take-away implicitly modifies the framework. Further actions in the food/dining context will take cognizance of this preference. Explicit personalization involves the user explicitly telling the engine 10 how to do a particular task (Call 911. Yell obscenities. Then call John Brown. Hire him immediately. If he declines, move the office down the road.)

The engine 10 is a human language, intent and sentiment processing system that resides locally on a device for interpreting user intent via verbal or typed natural language interactions—based and modeled on the mammalian brain. It is comprised of neural circuits, tracts and ensembles. These contain a multitude of neurons exchanging different kinds of neurotransmitters via carrier proteins.

Neural tracts are comprised of connected neurons with feed forward conduction. Neural circuits also incorporate feedback loops. Neural ensembles are collections of neural tracts and neural circuits layered together to achieve specific computations. Neurogenesis (wiring up of ensembles) is done at compile time for maximal speed and run time efficiencies.

Neural tracts include emulations of logical operators like "And", "Or", "None" etc. while its Neural circuits include "Sequence", "FirstNOfM" etc.

Neural ensembles enable the voice input and analysis and the concept genome system, which forms the Hippocampus of the system.

Voice Input Analysis

The auditory pathway is modeled on the inner ear endolymph and its capability is encapsulated by the (accumulator 16), The organ of Corti capability is encapsulated by the (dispatcher 18), The cochlear nucleus capability is encapsulated by the (normalizer 34), The cochlea capability is encapsulated by the (Windower 36 and Feature Generator (FFT) 38), Concept Genome System/Hippocampus The primary auditory cortex capability is encapsulated by the (phonemizer 40), The superior temporal gyms capability is encapsulated by the (affix detector 42 and closed word detector), The concept store 30 corresponds to long term memory and all memory recall is done via association using pyramidal neurons.

Concept-Tree Based Action Analyzer/Central Nervous System

The concept-tree based action system is the central nervous system (CNS).

Each of the action descriptors for the action items 56 is a motor unit. Motor units are of two types: fast-twitch, which correspond to native local action items and services (e.g. calendar, camera) and slow-twitch, which correspond to remote action items (e.g. Kayak.com)

The action template specializer 49 is the pre-motor cortex, which generates the templates that are used to query the action descriptors (motor units).

The AST generator 52 is the supplementary motor area, which instantiates the selected motor units.

The action executer 60 activates the motor unit.

FIG. 7 is a block diagram illustrating the mobile device 1024, illustrating a touch-sensitive display 1120 or a "touch screen" for convenience. The mobile device 1024 includes a memory 1020 (which may include one or more computer readable storage mediums), a memory controller 1220, one or more processing units (CPU's) 1200, a peripherals interface 1180, RF circuitry 1080, audio circuitry 1100, a speaker 1110, a microphone 1130, an input/output (I/O) subsystem 1060, other input or control devices 1160 and an external port 1240. These components communicate over one or more communication buses or signal lines 1030.

The various components shown in FIG. 7 may be implemented in hardware, software or a combination of both hardware and software, including one or more signal processing and/or application specific integrated circuits.

The memory 1020 may include high-speed random access memory and may also include non-volatile memory, such as one or more magnetic disk storage devices, flash memory devices, or other non-volatile solid-state memory devices. Access to the memory 1020 by other components of the mobile device 1024, such as the CPU 1200 and the peripherals interface 1180, is controlled by the memory controller 1220.

The peripherals interface 1180 connects the input and output peripherals of the device to the CPU 1200 and memory 1020. The one or more processors 1200 run or execute various software programs and/or sets of instructions stored in the memory 1020 to perform various functions for the mobile device 1024 and to process data.

The RF (radio frequency) circuitry 1080 receives and sends RF signals, also called electromagnetic signals. The RF circuitry 1080 converts electrical signals to/from electromagnetic signals and communicates with communications networks and other communications devices via the electromagnetic signals. The RF circuitry 1080 includes well-known circuitry for performing these functions, including an antenna system, an RF transceiver, one or more amplifiers, a tuner, one or more oscillators, a digital signal processor, a CODEC chipset, a subscriber identity module (SIM) card, memory, and so forth. The RF circuitry 1080 may communicate with networks, such as the Internet, also referred to as the World Wide Web (WWW), an intranet and/or a wireless network, such as a cellular telephone network, a wireless local area network (LAN) and/or a metropolitan area network (MAN), and other devices by wireless communication. The wireless communication may use any of a plurality of communications standards, protocols and technologies that are known in the art.

The audio circuitry 1100, the speaker 1110, and the microphone 1130 provide an audio interface between a user and the mobile device 1024. The audio circuitry 1100 receives audio data from the peripherals interface 1180, converts the audio data to an electrical signal, and transmits the electrical signal to the speaker 1110. The speaker 1110 converts the electrical signal to human-audible sound waves. The audio circuitry 1100 also receives electrical signals converted by the microphone 1130 from sound waves. The audio circuitry 1100 converts the electrical signal to audio data and transmits the audio data to the peripherals interface 1180 for processing. The audio circuitry 1100 also includes a headset jack serving as an interface between the audio circuitry 1100 and removable audio input/output peripherals, such as output-only headphones or a headset with both output (e.g., a headphone for one or both ears) and input (e.g., a microphone).

The I/O subsystem 1060 connects input/output peripherals on the mobile device 1024, such as the touch screen 1120 and other input/control devices 1160, to the peripherals interface 1180. The I/O subsystem 1060 includes a display controller 1560 and one or more input controllers 1600 for other input or control devices. The one or more input controllers 1600 receive/send electrical signals from/to other input or control devices 1160. The other input/control devices 1160 may include physical buttons (e.g., push buttons, rocker buttons, etc.), dials, slider switches, joysticks, click wheels, and so forth all serving as forming part of an interface. The input controllers 1600 may be connected to any of the following: a keyboard, infrared port, USB port, and a pointer device such as a mouse. The one or more buttons may include an up/down button for volume control of the speaker 1110 and/or the microphone 1130. The one or more buttons may include a push button. A quick press of the push button may disengage a lock of the touch screen 1120 or begin a process that uses gestures on the touch screen to unlock the device. A longer press of the push button may turn power to the mobile device 1024 on or off. The touch screen 1120 is used to implement virtual or soft buttons and one or more soft keyboards.

The touch-sensitive touch screen 1120 provides an input interface and an output interface between the device and a user. The display controller 1560 receives and/or sends electrical signals from/to the touch screen 1120. The touch screen 1120 displays visual output to the user. The visual output may include graphics, text, icons, video, and any combination thereof (collectively termed "graphics"). In some embodiments, some or all of the visual output may correspond to user-interface objects, further details of which are described below.

A touch screen 1120 has a touch-sensitive surface, sensor or set of sensors that accepts input from the user based on haptic and/or tactile contact. The touch screen 1120 and the display controller 1560 (along with any associated modules and/or sets of instructions in memory 1020) detect contact (and any movement or breaking of the contact) on the touch screen 1120 and converts the detected contact into interaction with user-interface objects (e.g., one or more soft keys, icons, web pages or images) that are displayed on the touch screen. In an exemplary embodiment, a point of contact between a touch screen 1120 and the user corresponds to a finger of the user.

The touch screen 1120 may use LCD (liquid crystal display) technology, or LPD (light emitting polymer display) technology, although other display technologies may be used in other embodiments. The touch screen 1120 and the display controller 1560 may detect contact and any movement or breaking thereof using any of a plurality of touch sensing technologies now known or later developed, including but not limited to capacitive, resistive, infrared, and surface acoustic wave technologies, as well as other proximity sensor arrays or other elements for determining one or more points of contact with a touch screen 1120.

The user may make contact with the touch screen 1120 using any suitable object or appendage, such as a stylus, a finger, and so forth. In some embodiments, the user interface is designed to work primarily with finger-based contacts and gestures, which are much less precise than stylus-based input due to the larger area of contact of a finger on the touch screen. In some embodiments, the device translates the rough finger-based input into a precise pointer/cursor position or command for performing the actions desired by the user.

The mobile device 1024 also includes a power system 1620 for powering the various components. The power system 1620 may include a power management system, one or more power sources (e.g., battery, alternating current (AC)), a recharging system, a power failure detection circuit, a power converter or inverter, a power status indicator (e.g., a light-emitting diode (LED)) and any other components associated with the generation, management and distribution of power in portable devices.

The software components stored in memory 1020 include an operating system 1260, a communication module (or set of instructions) 1280, a contact/motion module (or set of instructions) 1300, a graphics module (or set of instructions) 1320, a text input module (or set of instructions) 1340, and applications (or set of instructions) 1360.

The operating system 1260 (e.g., Darwin, RTXC, LINUX, UNIX, OS X, WINDOWS, or an embedded operating system such as VxWorks) includes various software components and/or drivers for controlling and managing general system tasks (e.g., memory management, storage device control, power management, etc.) and facilitates communication between various hardware and software components.

The communication module 1280 facilitates communication with other devices over one or more external ports 1240 and also includes various software components for handling data received by the RF circuitry 1080 and/or the external port 1240. The external port 1240 (e.g., Universal Serial Bus (USB), FIREWIRE, etc.) is adapted for coupling directly to other devices or indirectly over a network (e.g., the Internet, wireless LAN, etc.).

The contact/motion module 1300 may detect contact with the touch screen 1120 (in conjunction with the display controller 1560) and other touch sensitive devices (e.g., a touchpad or physical click wheel). The contact/motion module 1300 includes various software components for performing various operations related to detection of contact, such as determining if contact has occurred, determining if there is movement of the contact and tracking the movement across the touch screen 1120, and determining if the contact has been broken (i.e., if the contact has ceased). Determining movement of the point of contact may include determining speed (magnitude), velocity (magnitude and direction), and/or an acceleration (a change in magnitude and/or direction) of the point of contact. These operations may be applied to single contacts (e.g., one finger contacts) or to multiple simultaneous contacts (e.g., "multitouch"/multiple finger contacts). The contact/motion module 1300 and the display controller 1560 also detects contact on a touchpad.

The graphics module 1320 includes various known software components for rendering and displaying graphics on the touch screen 1120, including components for changing the intensity of graphics that are displayed. As used herein, the term "graphics" includes any object that can be displayed to a user, including text, web pages, icons (such as user-interface objects including soft keys), digital images, videos, animations and the like.

The text input module 1340, which may be a component of graphics module 1320, provides soft keyboards for entering text in various applications (e.g., contacts, e-mail, IM, blogging, browser, and any other application that needs text input). The applications 1360 may include the executable application 64.

While certain exemplary embodiments have been described and shown in the accompanying drawings, it is to be understood that such embodiments are merely illustrative and not restrictive of the current invention, and that this invention is not restricted to the specific constructions and arrangements shown and described since modifications may occur to those ordinarily skilled in the art.

What is claimed:

1. A computer system for interacting with a user, comprising:
   a processor;
   a storage medium connected to the processor;
   at least two microphones detecting sound to obtain a stereo input, the sound including speech from the user and background noise;
   a set of instructions on the storage medium and executable by the processor, the set of instructions including:
   a fast switcher:
      determining whether sound can be detected through the two microphones simultaneously;
      if the sound can be detected through the two microphones simultaneously then detecting the sound through the two microphones simultaneously; and
      if the sound cannot be detected through the two microphones simultaneously then switching detection of the sound between the two microphones;
   a triangulator analyzing the stereo input to isolate the speech from the sound using a triangulated position of the user relative to the two microphones; and
   a dispatcher submitting the speech for analysis.

2. The computer system of claim 1, wherein the triangulator includes a convoluted triangulator that:
   measures frequency of the sound in the time domain;
   uses a fast Fourier transform to obtain sound magnitude in the frequency domain;
   calculates an instantaneous magnitude across the frequency domain;
   stores the instantaneous magnitude in a respective bin of a plurality of bins; and
   groups the bins in groups having similar magnitude to isolate sources of the sound.

3. The computer system of claim 2, wherein the triangulator includes an instantaneous triangulator that:
   executes a fast independent component analysis (FastICA) for each group.

4. The computer system of claim 1, further comprising:
   at least one data store;
   a set of concepts in the data store, the set of concepts initially forming a target set of concepts;
   a plurality of action items in the data store;
   an analysis system that executes a plurality of narrowing cycles until a concept packet having at least one concept has been identified, wherein each narrowing cycle includes:
   i) identifying at least one portion of the language; and
   ii) based on the portion of the language identifying a subset of concepts from the target set of concepts, the subset of concepts forming the target set of concepts to the exclusion of concepts previously forming part of the target set of concepts that are not based on the portion of the language;
   an action item identifier that identifies an action item from the action items based on the concept packet; and
   an action executer that executes an action based on the action item that has been identified.

5. A computer-based method of interacting with a user, comprising:
   determining, with a processor, whether sound can be detected through at least two microphones simultaneously;
   detecting, with the processor, sound using the two microphones to obtain a stereo input, the sound including speech from the user and background noise, wherein:
   if the sound can be detected through the two microphones simultaneously then the detection of the sound is through the two microphones simultaneously; and
   if the sound cannot be detected through the two microphones simultaneously the detection of the sound is by switching detection of the sound between the two microphones;
   analyzing, with the processor, the stereo input to isolate the speech from the sound using a triangulated position of the user relative to the two microphones; and
   dispatching with the processor, the speech for analysis.

6. A non-transitory computer-readable medium having storage thereon and a set of instructions executable by a processor of a computer to perform a computer-based method of interacting with a user, comprising:
   determining, with a processor, whether sound can be detected through at least two microphones simultaneously;
   detecting, with the processor, sound using the two microphones to obtain a stereo input, the sound including speech from the user and background noise, wherein:
   if the sound can be detected through the two microphones simultaneously then the detection of the sound is through the two microphones simultaneously; and
   if the sound cannot be detected through the two microphones simultaneously the detection of the sound is by switching detection of the sound between the two microphones;
   analyzing, with the processor, the stereo input to isolate the speech from the sound using a triangulated position of the user relative to the two microphones; and
   dispatching with the processor, the speech for analysis.

* * * * *